(12) United States Patent
Whelan

(10) Patent No.: US 8,777,051 B2
(45) Date of Patent: Jul. 15, 2014

(54) FUEL VENTING SYSTEMS HAVING PROTECTIVE MEMBRANES

(75) Inventor: Sean Whelan, Lansing, MI (US)

(73) Assignee: Brunswick Corporation, Lake Forest, IL (US)

( * ) Notice: Subject to any disclaimer, the term of this patent is extended or adjusted under 35 U.S.C. 154(b) by 1266 days.

(21) Appl. No.: 12/391,782

(22) Filed: Feb. 24, 2009

(65) Prior Publication Data

US 2009/0250119 A1 Oct. 8, 2009

Related U.S. Application Data

(63) Continuation-in-part of application No. 12/061,183, filed on Apr. 2, 2008.

(51) Int. Cl.
*B60K 15/035* (2006.01)

(52) U.S. Cl.
USPC .................. 220/746; 220/203.01; 220/203.19

(58) Field of Classification Search
USPC ........... 220/746, 747, 86.2, 203.01, 371, 372, 220/367.1, 745, 366.1, 254.1, 255, 203.19, 220/203.29, DIG. 32, DIG. 33; 137/197, 137/526; 96/6; 296/97.22
See application file for complete search history.

(56) References Cited

U.S. PATENT DOCUMENTS

| | | | |
|---|---|---|---|
| 3,149,758 A | 9/1964 | Bush et al. | |
| 4,113,138 A | 9/1978 | Fields et al. | |
| 4,136,796 A | 1/1979 | Dubois et al. | |
| 4,168,012 A | 9/1979 | Hawkinson | |
| 4,512,499 A | 4/1985 | Uuskallio | |
| 4,825,905 A * | 5/1989 | Whitley, II | ..................... 137/587 |
| 5,275,213 A | 1/1994 | Perkins | |
| 5,327,946 A | 7/1994 | Perkins | |
| 5,503,199 A | 4/1996 | Whitley, II et al. | |
| 5,507,324 A | 4/1996 | Whitley, II et al. | |
| 5,522,769 A * | 6/1996 | DeGuiseppi | ................... 454/270 |
| 5,730,183 A * | 3/1998 | Kremsler | ................... 137/493.8 |
| 5,762,093 A | 6/1998 | Whitley, II | |
| 6,095,363 A | 8/2000 | Harris et al. | |
| 6,557,719 B1 * | 5/2003 | Arnal et al. | ................... 220/562 |
| 6,719,824 B1 | 4/2004 | Bowser | |

(Continued)

FOREIGN PATENT DOCUMENTS

| | | |
|---|---|---|
| DE | 19632690 | 2/1998 |
| EP | 0 831 572 | 3/1998 |

(Continued)

OTHER PUBLICATIONS

United States Patent and Trademark Office, "Final Office Action," issued in connection with U.S. Appl. No. 12/061,183, mailed Mar. 2, 2012, 35 pages.

(Continued)

*Primary Examiner* — Anthony Stashick
*Assistant Examiner* — Mollie Llewellyn
(74) *Attorney, Agent, or Firm* — Hanley, Flight & Zimmerman, LLC

(57) ABSTRACT

Venting systems for use with fuel tank systems are described. An example venting system includes a membrane disposed within a vent line or an emission control component to form a passageway through the venting system. The membrane is coated with a hydrophobic material to substantially prevent the flow of liquid and permit the flow of vapors or gases through the passageway.

23 Claims, 7 Drawing Sheets

(56) References Cited

U.S. PATENT DOCUMENTS

| | | | |
|---|---|---|---|
| 6,895,943 B1 * | 5/2005 | Taxon | 123/516 |
| 6,908,874 B2 | 6/2005 | Woodhead et al. | |
| 7,066,504 B2 | 6/2006 | Perkins | |
| 7,080,657 B1 | 7/2006 | Scott | |
| 7,159,741 B2 | 1/2007 | Dehn et al. | |
| 7,166,024 B2 | 1/2007 | Mashiko et al. | |
| 7,367,998 B2 * | 5/2008 | Moessinger | 55/505 |
| 7,491,258 B2 * | 2/2009 | Gouzou et al. | 95/46 |
| 2006/0096909 A1 | 5/2006 | Patch | |
| 2006/0157117 A1 | 7/2006 | Scott | |
| 2007/0170186 A1 | 7/2007 | Bertani | |
| 2007/0175514 A1 | 8/2007 | Tharp et al. | |
| 2009/0250468 A1 | 10/2009 | Whelan et al. | |

FOREIGN PATENT DOCUMENTS

| | | |
|---|---|---|
| EP | 1892029 | 2/2008 |
| EP | 2106950 | 4/2009 |
| EP | 2106949 | 10/2009 |
| FR | 2774951 | 8/1999 |
| GB | 2 376 460 | 12/2002 |
| WO | 96/16288 | 5/1996 |
| WO | 2008/105724 | 9/2008 |

OTHER PUBLICATIONS

United States Patent and Trademark Office, "Non-Final Office Action", issued in connection with U.S. Appl. No. 12/061,183, mailed Mar. 18, 2011, 17 pages.

European Patent Office, "Extended European Search Report," issued in connection with European Patent Application No. 09004896.8 on May 27, 2013, 7 pages.

United States Patent and Trademark Office, "Non-Final Office Action," issued in connection with U.S. Appl. No. 12/061,183, on Aug. 12, 2013, 11 pages.

European Patent Office, "Extended European Search Report," issued in connection with European Patent Application No. 09004897.6, Sep. 30, 2013 (6 pages).

United States Patent and Trademark Office, "Final Rejection," issued in connection with U.S. Appl. No. 12/061,183, Dec. 6, 2013 (16 pages).

United States Patent and Trademark Office, "Non-Final Office Action", issued in connection with U.S. Appl. No. 12/061,183, mailed Mar. 10, 2014, 24 pages.

* cited by examiner

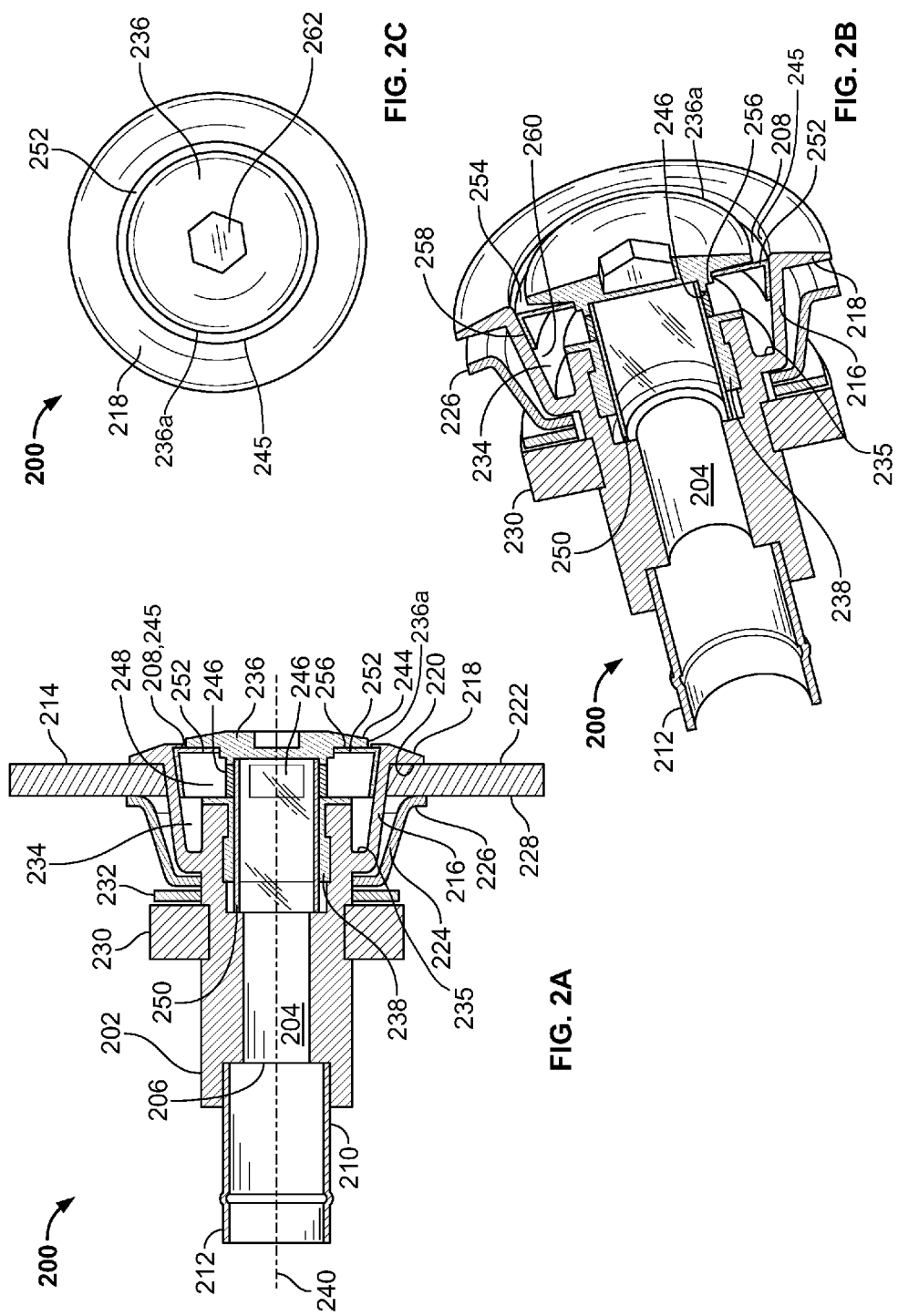

FUEL VENTING SYSTEMS HAVING PROTECTIVE MEMBRANES

CROSS REFERENCE TO RELATED APPLICATION

This patent is a continuation-in-part of U.S. patent application Ser. No. 12/061,183, filed Apr. 2, 2008, entitled "FUEL CAP APPARATUS FOR USE WITH FUEL VENTING SYSTEMS," which is incorporated herein by reference in its entirety.

FIELD OF THE DISCLOSURE

The present disclosure relates generally to venting systems and, more particularly, to venting systems having protective membranes.

BACKGROUND

Many vehicles such as boats and other marine crafts have fuel systems that require venting. For example, venting a fuel tank equalizes the pressure in the tank by releasing fuel vapors and allowing atmospheric air to flow into the fuel tank so that the liquid fuel can be drawn from the tank via suction. Some venting systems employ a separate venting tube or line to vent the fuel tank, while other venting systems employ a venting tube in combination with a filling device. Although a separate vent tube prevents the buildup of fuel pressure within the tank, it does not prevent contamination of the environment as a result of unintentional overboard venting of liquid fuel, which frequently occurs when a marine fuel tank is being refueled due to fuel tank overfilling and/or due to splashing, sloshing or other fuel surges during boat movement. Additionally, separate vent tubes are prone to allow the ingress of water and other contaminates into the fuel stored in the tank, which can lead to engine damage.

BRIEF DESCRIPTION OF THE DRAWINGS

FIG. 2A illustrate a sectional view of an example vent apparatus described herein.

FIG. 2B illustrates another sectional view of the example vent apparatus of FIG. 2A.

FIG. 2C illustrates an end view of the example vent apparatus of FIGS. 2A and 2B.

DETAILED DESCRIPTION

Figure 1:
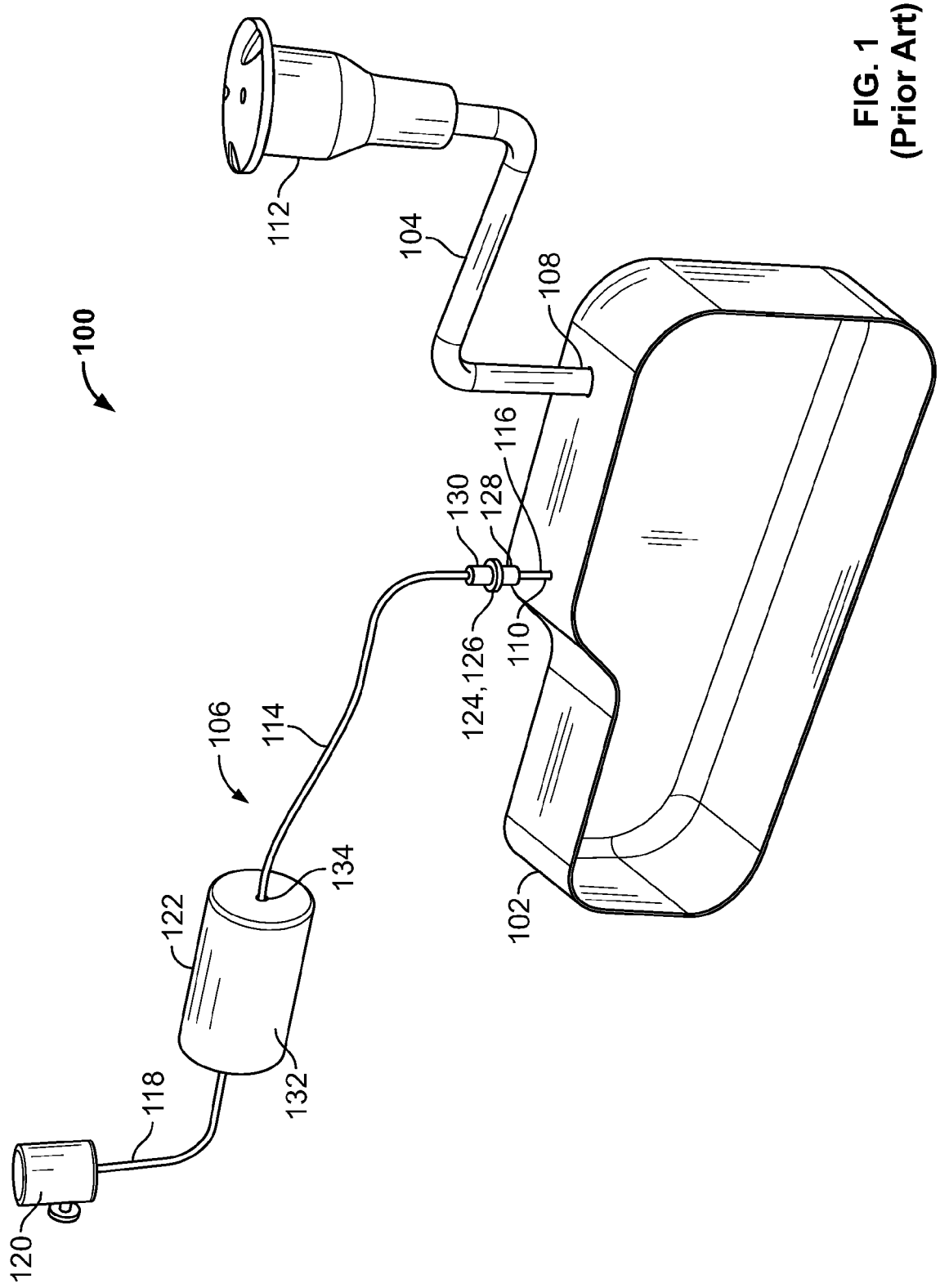
FIG. 1 is schematic representation of a known example fuel tank system.

The examples described herein include venting systems having protective membranes for use with fuel tank systems such as, for example, a fuel tank system of a marine craft (e.g., a boat). In general, some known marine fuel tank systems include a fuel tank coupled to a filler tube such as, for example, a deckfill, to receive fuel (e.g., gasoline) and a venting system to vent fuel vapors from the fuel tank to equalize the pressure in the fuel tank and/or release fuel vapors to accommodate volumetric changes of fuel in the fuel tank.

One known venting system includes a vent line coupled to a fuel tank at a first end and vented to the atmosphere at a second end. Atmospheric pressure in a fuel tank is maintained by venting the fuel tank through the vent line. However, in such known venting systems, liquid fuel is prone to escape from the fuel tank and to the environment via the vent line. For example, during refueling of the fuel tank, the incoming fuel displaces fuel vapors in the fuel tank to the atmosphere through the vent line because the incoming fuel produces a pressure in the fuel tank that is greater than the atmospheric pressure. As the fuel tank becomes full, the displaced vapors often carry liquid fuel to the environment. Such venting of the liquid fuel to the environment through the vent line can also occur during operation of the marine craft due to splashing, sloshing or other fuel surges.

To help reduce overboard venting of liquid fuel and/or pollutants to the environment via the vent line, some known venting systems typically include, for example, a surge protector, a vapor collection apparatus, a vent apparatus, a liquid-vapor separator, etc. For example, a surge protector may include a flow control member that engages an orifice defined in a body of the surge protector to block the flow of liquid fuel from the fuel tank when, for example, the fuel tank is overfilled or being filled to rapidly.

Although the above-noted known venting systems may help reduce contamination of the environment, these venting systems do not prevent contamination of the environment as a result of unintentional overboard venting of liquid fuel, which may occur when a marine fuel tank is overfilled during refueling and/or due to splashing, sloshing or other fuel surges during boat movement. Such overfilling may occur despite the addition of some known surge protectors, which are used to reduce unintentional overboard contamination of the environment. Additionally, these known venting systems do not prevent the ingress of water and/or other contaminates from contaminating the fuel stored in the fuel tank, which can lead to engine damage.

To prevent venting fuel to the atmosphere and/or the ingress of contaminates into the fuel tank, the example venting systems described herein include membranes coated with a material such as, for example, a hydrophobic material. The hydrophobic material may include a fluoropolymer material such as, for example, polytetrafluoroethylene (PTFE) (commonly known as Teflon®), etc. In one example, the membrane is formed from a screen mesh that is coated with the fluoropolymer material such as, for example, Teflon®. In yet another example, the membrane is a substrate (e.g., a synthetic fiber substrate) having micropores that is coated with the fluoropolymer material such as, for example, polytetrafluoroehtylene (commonly known as Teflon®).

The example membranes described herein repel liquid to prevent ingress of water and the egress of liquid fuel through the venting system, while permitting the flow of vapors and/or gases through the passageways formed by the example membranes. Additionally, due to the non-stick properties of the fluoropolymer material (e.g., Teflon®) used to form the membrane and its hydrophobic properties (e.g., its ability to repel water), the example screen mesh membranes and the example substrate membranes having micropores described herein can be sized to provide effective and sufficient cross-sectional venting area. As a result, the example screen mesh membranes and the substrate membranes can be sized so that the membranes do not substantially impair venting of gases and/or fuel vapors through the passageways formed by the membranes. In other words, venting occurs at substantially the same flow rate(s) as if the membrane was not coupled to the passageway, while preventing water and other contaminants from entering the venting system. Thus, the example venting systems described herein provide a cross-sectional venting area (i.e., the membranes coupled to the passageways) to allow effective and significant flow of fuel vapors and/or air therethrough, while substantially preventing the ingress of water and other contaminates from contaminating the fuel stored in the fuel tank and substantially preventing unintentional overboard venting of liquid fuel to the environment. Thus, the example membranes described herein do not hinder or impair the flow of vapors and/or gasses throughout the fuel venting system.

The example membranes described herein may be disposed within a vent line of a fuel venting system and/or other components of the fuel venting system. In particular, in one example fuel venting system described herein, an example vent apparatus includes a body coupled to a vent line at a first end or inlet of the body and to a surface such as, for example, a hull of a boat, at a second end or outlet of the body. The vent apparatus includes a cover that is removably coupled to the outlet of the body and which has a passageway to fluidly couple the inlet and the outlet. A membrane such as, for example, a screen mesh coated with a fluoropolymer material such as, for example, Teflon® is disposed between the passageway and the outlet of the body. In one example, the membrane is coupled to a surface of the cover via, for example, chemical bonding. The example membrane provides a venting passageway that substantially inhibits the ingress of water and other contaminants into a fuel tank and allows the ingress of atmospheric air and the egress of fuel vapors without substantially impairing the flow rates of the gases or fuel vapors through the passageway.

FIG. 1 illustrates a known example fuel tank system 100 such as, for example, a marine fuel tank system having evaporative emission controls. The example fuel tank system 100 includes a fuel tank 102 for storing fuel (e.g., gasoline, diesel fuel, etc.), a filler tube 104, and a venting system 106 to vent the fuel tank 102. The fuel tank 102 is coupled to the filler tube 104 at a first port 108 and to the venting system 106 at a second port 110. The filler tube 104 may include a deckfill 112 that is adapted for mounting to a deck of a marine craft such as, for example, a deck of a boat, and has an opening for receiving a nozzle such as, for example, a nozzle of a fuel pump, etc. In operation, the venting system 106 equalizes the pressure in the fuel tank 102 to accommodate volumetric changes in the fuel tank. For example, when the vapor pressure of fuel in the fuel tank 102 increases, fuel vapors are released from the fuel tank 102 through a tubular vent line 114. In the example the venting system 106, the tubular vent line 114 is coupled to the second port 110 of the fuel tank 102 at a first end 116 and vents to, for example, the atmosphere at a second end 118. In the illustrated example, to help reduce venting liquid fuel and/or pollutants to the environment, the venting system 106 also includes various evaporative emission control components such as, for example, a vent apparatus 120, a vapor collection apparatus 122, and/or a surge protector 124 or a liquid-vapor separator 126, which are coupled in fluid communication with the vent line 114.

In operation, an increase in pressure in the fuel tank 102 causes fuel vapors and/or air in the fuel tank 102 to vent or release to the atmosphere through the vent line 114. For example, as the fuel tank 102 is being filled via the deck fill 112, the level of fuel stored in the fuel tank 102 rises. The fuel vapors in the fuel tank 102 are displaced and vented from the fuel tank 102. However, such displacement of the fuel vapors from the fuel tank 102 may cause the fuel vapors to carry liquid fuel through the vent line 114 and out to the environment through the vent apparatus 120.

The liquid-vapor separator 126 may be fluidly coupled to the second port 110 of the fuel tank 102. The liquid-vapor separator 126 includes a body having an inlet 128 and an outlet 130. In FIG. 1, the example liquid-vapor separator 126 causes the liquid fuel to sink to a first portion or chamber toward the inlet 128 of the liquid-vapor separator 126, while enabling vapors to rise and pass through a second portion or chamber toward the outlet 130 of the liquid-vapor separator 126. However, the liquid-vapor separator 126 requires that gravity draw the liquid fuel toward the inlet 128 and, thus, the liquid-vapor separator 126 must be positioned or mounted in a substantially vertical orientation. However, even when mounted in a substantially vertical orientation, liquid fuel may escape or advance through the vent line 114 when a force in a direction toward the outlet 130 of the liquid-vapor separator 126 caused by the pressure in the fuel tank 102 is greater than the force of gravity in a direction toward the inlet 128.

Alternatively, the surge protector 124 may be fluidly coupled to the outlet port 110 of the fuel tank 102 instead of the liquid-vapor separator 126. The surge protector 124 includes a valve (e.g., a check valve) to prevent the flow of fluid therethrough. For example, during refueling, a rising level of fuel in the fuel tank 102 causes a flow control member (not shown) of the valve to move to a closed position to prevent the flow of liquid fuel through the valve. However, in some instances, preventing the flow of fluid through the surge protector 124 may cause backsplash of fuel onto the deck of the boat through the filler tube 104. Such backsplash can occur during filling when using a manually operated nozzle and/or an automatic nozzle when an automated shut-off is not activated.

The vapor collection apparatus 122 comprises a canister 132 having an emission(s)-capturing or filter material (e.g., an adsorbent material) such as, for example, activated carbon, charcoal, etc., that collects and stores evaporative emissions such as, for example, hydrocarbons to reduce pollution to the environment. The stored emissions captured and stored by the canister 132 are returned or carried to the fuel tank 102 as air flows through the canister 132 when the air is drawn from the atmosphere to the fuel tank 102 via the vent line 114. However, liquid fuel that enters the canister 132 saturates the filter material and, thus, prevents the filter material from collecting and storing the evaporative emissions. Thus, an inlet 134 of the canister 132 is typically fluidly coupled to the surge protector 124 or the liquid-vapor separator 126 to prevent liquid fuel from entering the canister 132. However, the surge protector 124 or the liquid-vapor separator 126 may not be effective in some instances, thereby enabling liquid fuel to pass through the canister 132 and impair its effectiveness to capture and store emissions (e.g., hydrocarbons).

The vent apparatus 120 typically couples the vent line 114 to the atmosphere. The vent apparatus 120 may be a fitting mountable to a hull of a boat. However, the vent apparatus 120 typically cannot prevent overboard venting of liquid fuel that escapes from the fuel tank 102 through the vent line 114. Furthermore, the known vent apparatus 120 may allow the ingress of water and/or other contaminants through the vent line 114, thereby contaminating fuel stored in the fuel tank 102.

As described below in connection with the examples illustrated in FIGS. 2A-2C, 3A-3B, 4A-4B and 5A-5B, to prevent venting of liquid fuel and/or the ingress of water or other contaminants through a fuel venting system, each of a vent line, a vent apparatus 200, a vapor collection apparatus 300, a surge protector 400, and/or a liquid-vapor separator 500 includes a membrane coated with a hydrophobic material such as, for example, a fluoropolymer material. The fluoropolymer material may include, for example, polytetrafluoroethylene (commonly known as Teflon®). The example membranes are coupled to passageways to inhibit the flow of fluid through the passageways and allow the flow of gases and/or fuel vapors through passageways without substantially impairing or hindering the flow rate of the vapors and/or gases through the passageways. Although not illustrated herein, in other examples, any other venting system components may be implemented with the example membranes described herein.

FIG. 2A illustrates the example vent apparatus 200 described herein. FIG. 2B illustrates another view of the example vent apparatus 200 of FIG. 2A. FIG. 2C illustrates an end view of the example vent apparatus 200 of FIGS. 2A and 2B. Referring to FIGS. 2A-2C, the vent apparatus 200 includes a body 202 having passage 204 between an inlet 206 and an outlet 208 of the body 202. The inlet 206 receives a second end 210 of a vent line 212 and the outlet 208 is in fluid communication with the atmosphere.

In the illustrated example, the vent apparatus 200 is a flush-mount configuration that mounts to, for example, a hull 214 of a boat (not shown). The body 202 includes a tapered portion 216 that includes a flange 218 having a first surface 220 to engage an outer surface 222 of the hull 214. A cup portion 224 is slidably mounted to the body 202 and disposed adjacent the tapered portion 216. The cup portion 224 has a lip 226 that engages an inner surface 228 of the hull 214 when the vent apparatus 200 in mounted to the hull 214 of the boat. The body 202 also includes a mounting nut 230 (e.g., a flange nut) that threadably couples to the body 202 for securing the vent apparatus 200 to the hull 214 of the boat. A washer 232 may be disposed between the nut 230 and the cup portion 224.

The tapered portion 216 of the body 202 forms a cavity 234 to receive a cover 236. The cavity 234 includes a well 235 to provide a fluid trap or a tortuous path to further help prevent the ingress of liquid in the passage 204 and/or the egress of liquid fuel from the inlet 206 to the outlet 208. As shown, the well 235 is an annular recess. In the illustrated example, the cover 236 includes a generally cylindrical portion 238 extending along a longitudinal axis 240 and having a flange 244. The cover 236 is removably coupled to the outlet 208 of the body 202. The body 202 and a peripheral edge 236a of the cover 236 form a gap 245 to define the outlet 208 when the cover 236 is coupled to the outlet 208 of the body 202. The cover 236 includes an aperture 246 to form a passageway 248 that fluidly couples the inlet 206 and the outlet 208. The vent apparatus 200 may also include a screen member 250 disposed within the body 202 and/or the cylindrical portion 238 to arrest or filter the passage ember particles in the fuel vapors that may produce sparks. Also, the cover 236 and the body 202 provide a deflection guard that prevents the ingress of relatively large contaminants through the outlet 208.

The example vent apparatus 200 includes a membrane 252 disposed between the passageway 248 formed by the aperture 246 of the cylindrical portion 238 and the outlet 208 of the body 202. More specifically, the membrane 252 is positioned adjacent the gap 245 such that at least a portion of the membrane 252 covers the gap 245 (e.g., is in fluid communication with the gap 245) formed between the cover 236 and the body 202 when the cover 236 is coupled to the body 202. The membrane 252 is coated with a hydrophobic material such as, for example, a fluoropolymer material. The fluoropolymer material may be, for example, polytetrafluoroethylene, perfluoroalkoxy, fluorinated ethylene propylene, etc. In the illustrated example, the membrane 252 is a stainless steel mesh screen coated with a fluoropolymer material such as, for example, Teflon®. The coated membrane 252 permits the flow of gas or fuel vapors through the outlet 208 and inhibits the flow of liquid from entering through the outlet 208 to the fuel tank (e.g., the fuel tank 102 of FIG. 1). Additionally or alternatively, the membrane 252 prevents the egress of liquid fuel that may escape through the vent line 212 during fueling and/or operation of a marine craft. In contrast to the example vent apparatus 120 of FIG. 1, the example vent apparatus 200 prevents overboard venting of liquid fuel to the environment and also prevents the ingress of contaminants without substantially affecting or impairing the flow rate of the gasses or vapors through the passageway 248.

As most clearly shown in FIG. 2B, the membrane 252 has an L-shaped cross section. A first surface 254 of the membrane 252 is chemically bonded to an inner surface 256 of the flange 244 and a second surface 258 engages an inner surface 260 of the cavity 234 formed by the tapered portion 216 of the body 202. However, in other examples, the membrane 252 may have any other suitable shape and/or may be integrally formed (e.g., via insert molding) with the cover 236 to form one or more passageways 248. In yet other example implementations, the membrane 252 can be coupled to the passageway 248 via adhesives, chemical fasteners, or any other suitable fastening mechanism(s).

The cover 236 includes a recess (e.g., a hex-shaped recess) to receive a tool such as, for example, a hex wrench. The cover 236 is removably coupled to the outlet 208 of the body 202 to enable or facilitate maintenance and/or cleaning of the vent apparatus 200. Although not shown, the cylindrical portion 238 and the body 202 include threads to threadably couple the cover 236 to the body 202. However, in other examples, the cover 236 may couple to the body 202 with any other suitable fastening mechanism(s). As illustrated in FIG. 2C, when the cover 236 is coupled to the body 202, the membrane 252 is disposed between the cover 236 and the flange 218 of the body 202 and prevents the ingress of liquid (e.g., that may splash during operation of the boat) from entering through the outlet 208 of the vent apparatus 200.

The body 202, the cover 236, the cup 224, and/or other components of the vent apparatus 200 can be made of corrosion resistant material and/or impact resistant resinous materials such as, for example, polypropylene, nylon, stainless steel, or any other suitable materials and/or combinations thereof. Although the vent apparatus 200 is shown as a flush mount vent apparatus, in other examples, the vent apparatus may be a surface mount vent apparatus or any other suitable vent apparatus.

Figure 3A:
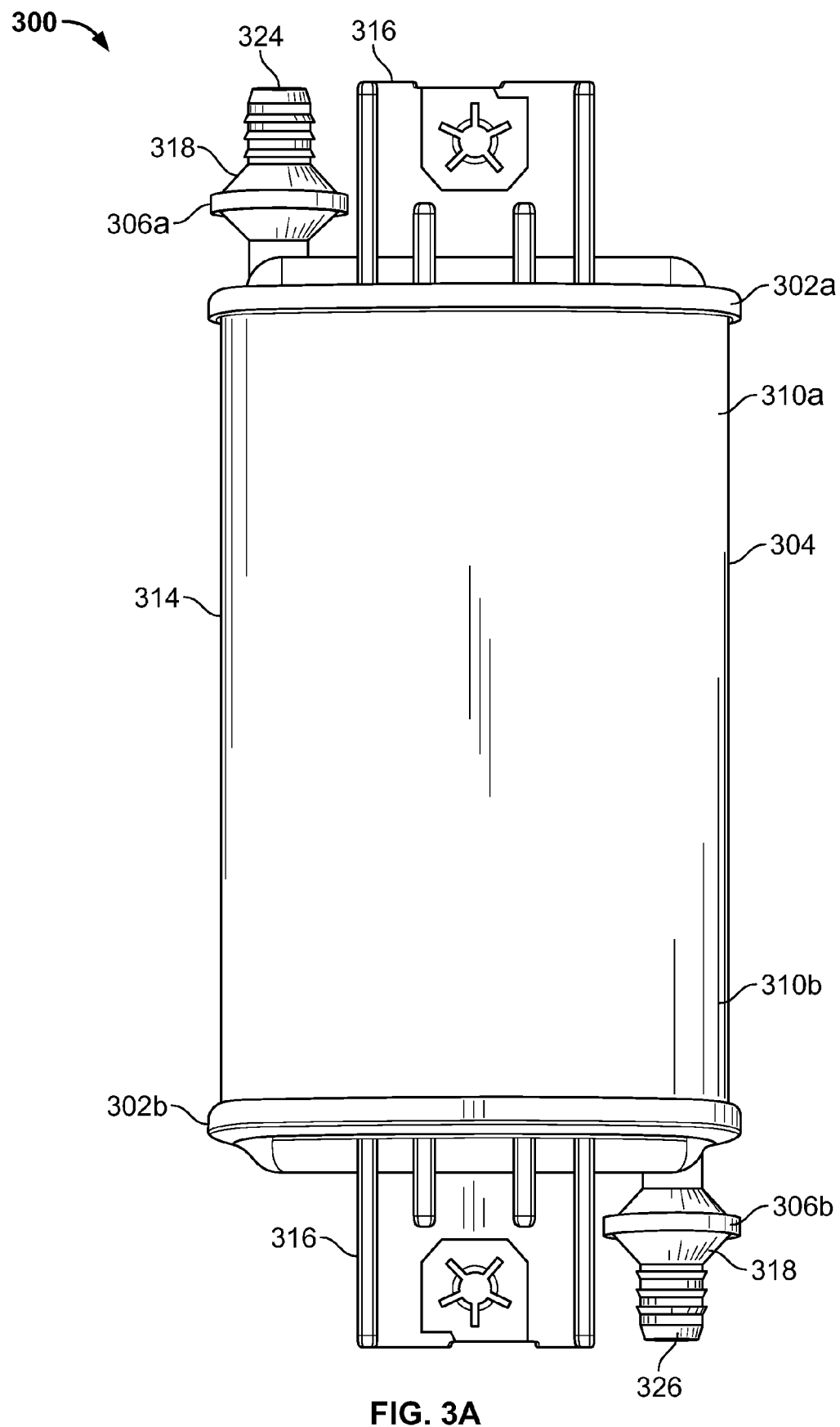
FIG. 3A illustrates an example vapor collection apparatus described herein.
Figure 3B:
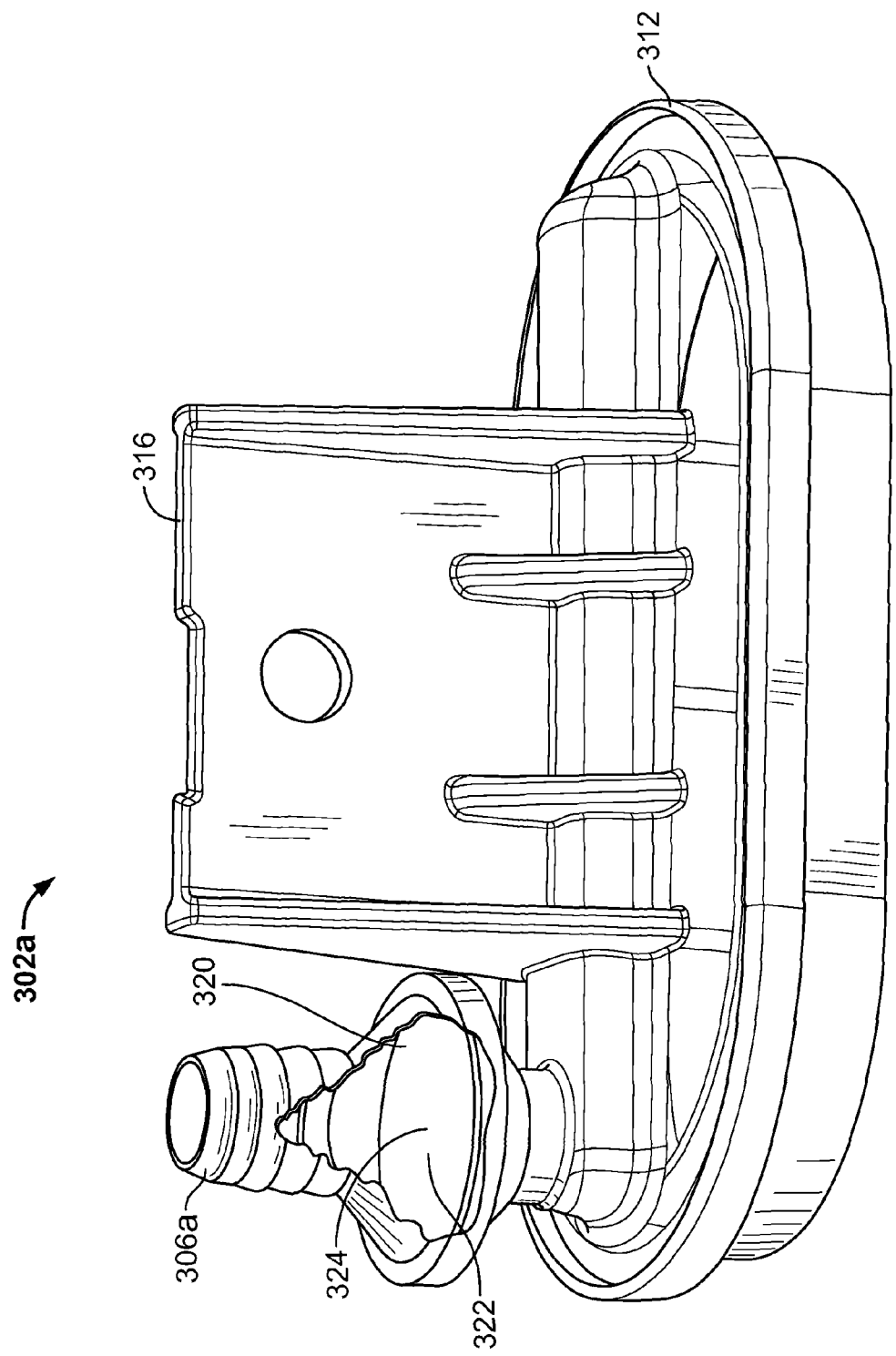
FIG. 3B illustrates an end portion of the example vapor collection apparatus of FIG. 3A.
Figure 3C:
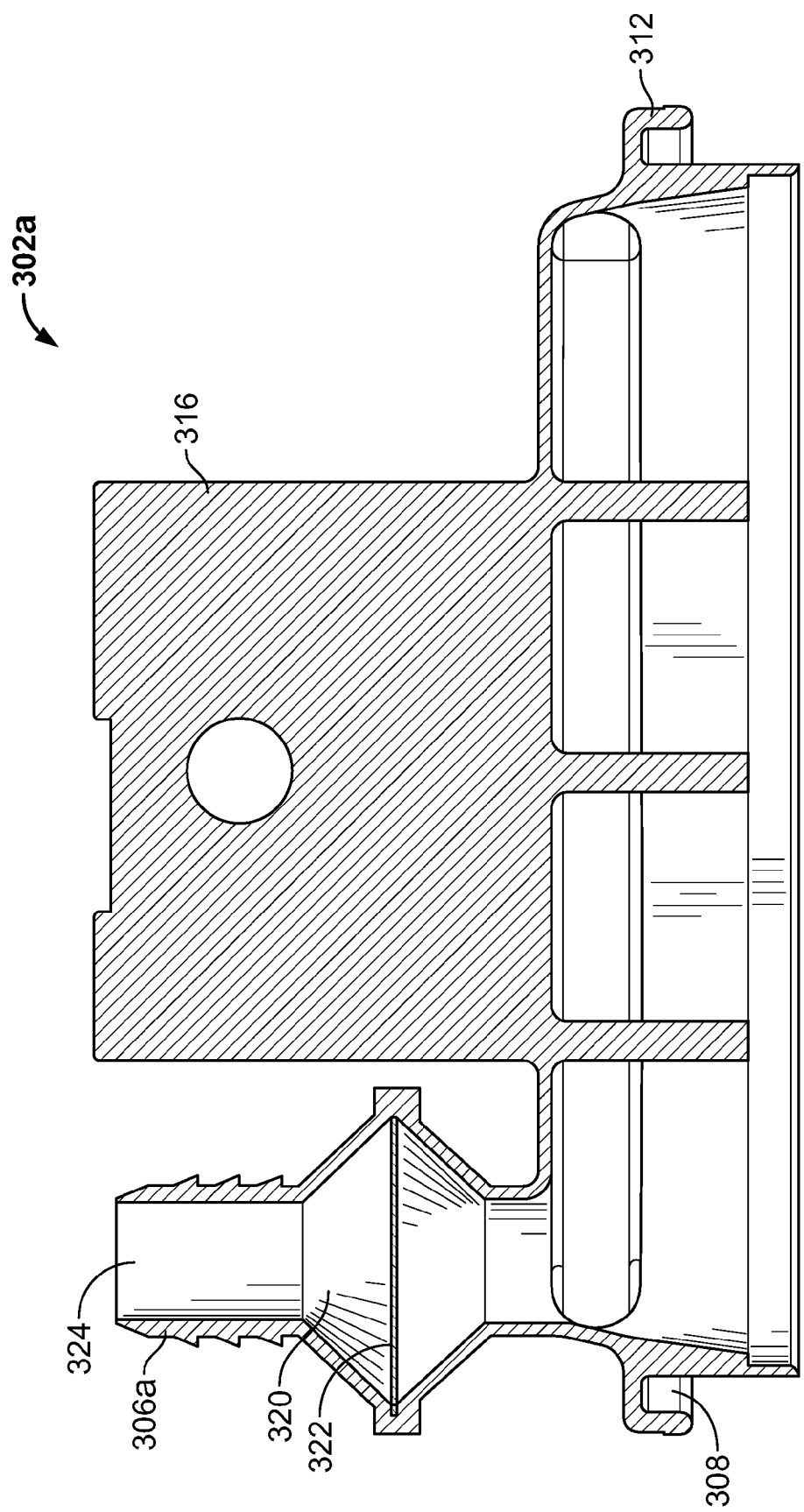
FIG. 3C is a cross-sectional view of the example apparatus shown in FIGS. 3A and 3B.

FIG. 3A illustrates an example vapor collection apparatus 300 described herein. FIG. 3B illustrates a partial cutaway view of an end 302a of the example vapor collection apparatus 300 of FIG. 3A. FIG. 3C is a cross-sectional view of the apparatus 300 of FIGS. 3A and 3B. The example vapor collection apparatus 300 collects and stores evaporative emissions (e.g., hydrocarbons) that vent from a fuel tank (e.g., the fuel tank 102 of FIG. 1).

Referring the FIGS. 3A-3C, the example vapor collection apparatus 300 includes a housing or canister 304 disposed between the end 302a and an end 302b. The ends 302a and 302b capture the canister 304 so that a port or inlet 306a and a port or outlet 306b of the respective ends 302a and 302b form a pathway through the canister 304. The canister 304 has an emission-capture or filter material (e.g., an adsorbent material) such as, for example, activated carbon disposed therein. The ends 302a and 302b may be made of, for example, metal, polymers, corrosion resistant materials, or any other suitable material(s).

The ends 302a and 302b include a recess or groove 308 (FIG. 3C) to receive ends 310a and 310b of the canister 304, respectively. The groove 308 forms a lip 312 that engages a surface 314 (e.g., an outer surface) of the canister 304 to maintain the canister 304 in alignment and engagement with the ends 302a and 302b. In this example, the ends 302a and 302b include mounting brackets 316 to secure the canister 304 to a surface (not shown) of a boat. In this manner, the vapor collection apparatus 300 may be mounted to a surface of a boat in any suitable orientation. The example canister 304 may be a rectangular-shaped member, a cylindrical-shaped member, or any other suitable polygonal-shaped member.

The canister 304, for example, may be in fluid communication with a fuel tank such as, for example, the fuel tank 102 of FIG. 1 via the port 306a and may be, for example, in fluid communication with a vent such as, for example, the vent apparatus 200 of FIGS. 2A-2C via the port 306b. In this manner, fuel vapors entering the canister 304 through port 306a pass through the filter material in the canister 304 before passing to the port 306b.

The ports 306a and 306b have an enlarged portion 318 to form a cavity 320. A membrane 322 coated with a hydrophobic material such as, for example, a fluoropolymer material, is disposed in the cavity 320 of the port 306a provide a passageway 324 that inhibits or prevents liquid fuel from entering the canister 304, but which allows the flow of gases or vapors therethrough without substantially impairing or affecting the flow rate of the gasses or vapors through the passageway 324. The fluoropolymer material may include, for example, polytetrafluoroethylene, perfluoroalkoxy, fluorinated ethylene propylene, etc.

Failure to prevent liquid fuel from entering the canister 304 may cause the filter material to become saturated and, thus, degrade or destroy the emissions storage capability of the canister 304. Although not shown, the port 306b may also include the coated membrane 322 disposed within the cavity (e.g., the cavity 320) to provide a passageway 326 that inhibits the flow of contaminants through the port 306b, while allowing the flow of gases and/or vapors through the port 306b without substantially impairing or affecting the flow rate of the gasses or vapors through the passageway 326.

The membrane 322 may be made of a substrate such as, for example, a synthetic fiber substrate, a woven substrate, etc., having micropores and may be coated with Teflon® material. The substrate may be any suitable material such as, for example, paper, fiberglass, wire mesh cloth, woven fabric, nylon and/or any other suitable material having micropores. Due to the ability of the coated membrane 322 to repel water, the micropores can be sized larger to provide an effective and sufficient cross-sectional venting area so that the gases and/or fuel vapors vent through the passageways 324 and 326 formed by the membrane 322 at substantially the same flow rate as a passageway formed without the example membrane 322. Thus, the example vapor collection apparatus 300 provides a cross-sectional venting area (i.e., the passageways 324 and 326 having the membrane 322) large enough to allow effective flow of fuel vapors and air, while substantially preventing liquid fuel from entering the canister 302 and/or venting to the environment.

In operation, the vapor collection apparatus 300 receives fuel vapors via the port 306a, which may be in fluid communication with a fuel tank via a vent line (e.g., the vent line 118). As the fuel vapors pass through the canister 304, the emissions (e.g., hydrocarbons) are removed from the fuel vapors and are captured by the filter material and stored in the canister 304. For example, when the pressure in the fuel tank increases, the fuel vapors are released from the fuel tank through the vent line. The membrane 322 allows the flow vapors to pass through the canister 304 via the port 306a, where they are captured by the filter material. Additionally, when liquid fuel surges toward the port 306a of the canister 304 via the vent line, the membrane 322 prevents the ingress of the liquid fuel into the canister 304.

Conversely, as the vapor pressure in the fuel tank decreases, air is drawn in between the port 306b and the port 306a. The air carries the stored emissions (e.g., the hydrocarbons) from the canister 304 to the fuel tank. The membrane 322 prevents liquid and/or other contaminates from passing through the canister 304 via the port 306b and into the fuel tank. Thus, in contrast to the known example vapor collection apparatus 122 of FIG. 1, the example vapor collection apparatus 300 prevents the ingress of liquid fuel through the port 306a of the canister 304 and/or prevents the ingress of contaminates through the port 306b while allowing the vapors or gasses to pass through the passageways 324 and 326 without substantially impairing or affecting the flow rate of the gasses or vapors through the passageways 324 and 326.

The vapor collection apparatus 300 may be made of corrosion resistant materials such as, for example, thermoplastic polymers, stainless steel, aluminum, a combination thereof, and/or any other suitable material.

Figure 4A:
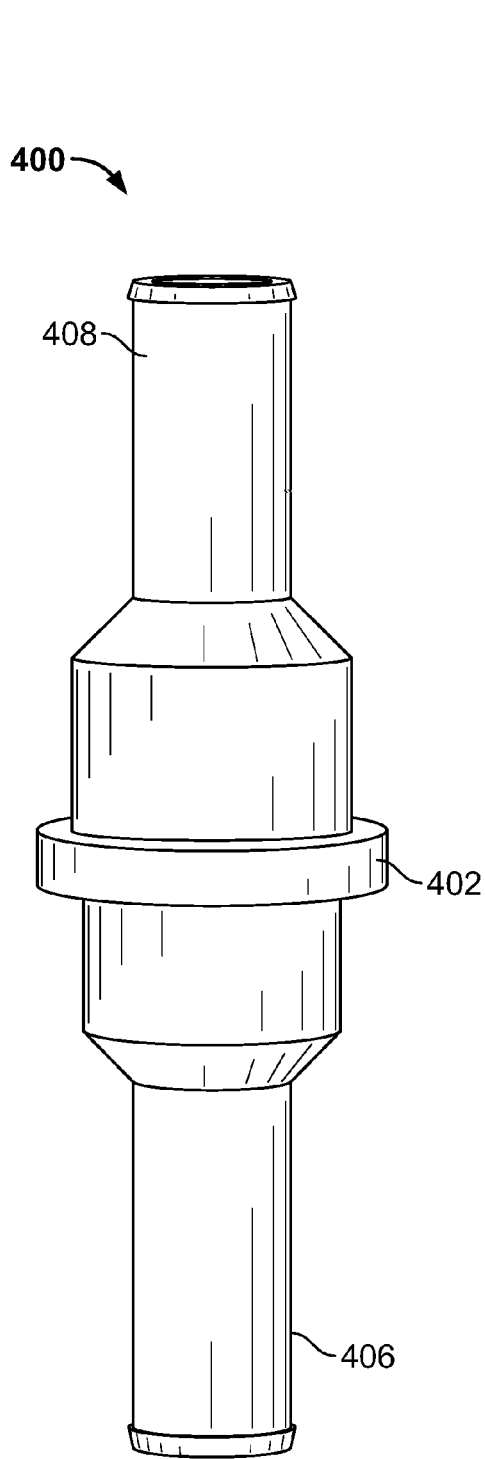
FIG. 4A illustrates an example surge protector apparatus described herein.
Figure 4B:
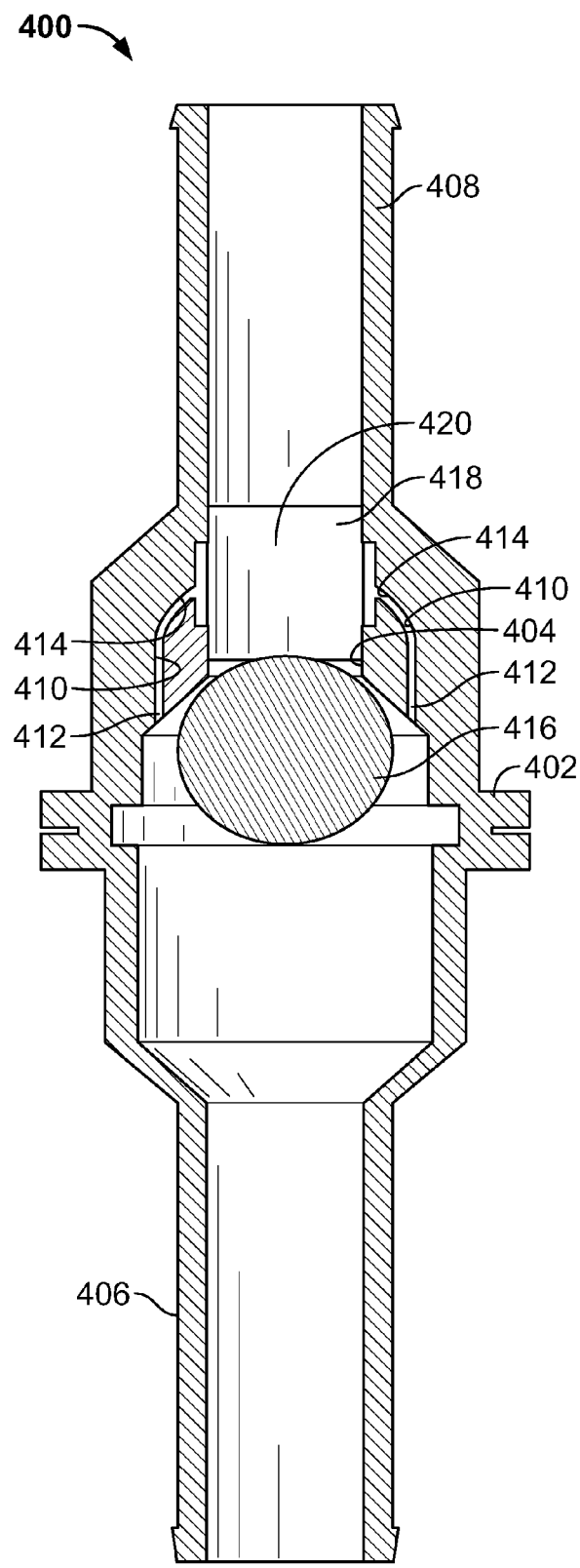
FIG. 4B is a sectional view of the example surge protector apparatus of FIG. 4A.

FIG. 4A illustrates the example surge protector apparatus 400 described herein and FIG. 4B is a sectional view of the example surge protector apparatus 400 of FIG. 4A. Referring to FIGS. 4A and 4B, the example surge protector 400 includes a body 402 defining an orifice 404 between an inlet 406 and an outlet 408. The inlet 406 may be in fluid communication with a fuel tank (e.g., the fuel tank 102 of FIG. 1) and the outlet 408 may be in fluid communication with a vent apparatus (e.g., the vent apparatus 200 of FIGS. 2A-2C) and/or other emission control apparatus (e.g., the vapor collection apparatus 300 of FIGS. 3A and 3B). Thus, in one example, the example surge protector 400 prevents liquid fuel from venting between the fuel tank and the atmosphere. In another example, the surge protector 400 prevents liquid fuel from venting between the fuel tank 102 and an emission collection apparatus (e.g., the canister 300 of FIGS. 3A and 3B) disposed between the surge protector 400 and the atmosphere. In the illustrated example, the surge protector 400 is illustrated as a blow-up valve. However, in other examples, the surge protector 400 may be a check valve and/or any other suitable valve. The surge protector 400 may be made of corrosion resistant material such as, for example, polymer, stainless steel, and/or any other suitable material.

In the illustrated example, the body 402 includes channels 410 formed therein. The channels 410 have a first end 412 in fluid communication with the inlet 406 and a second end 414 in fluid communication with the outlet 406. A flow control member 416 (e.g., a ball) is disposed within the body 402 and which can move toward the orifice 404 to prevent liquid fuel from passing between the inlet 406 and the outlet 408.

A membrane 418 is disposed within the body 402 between the second end 414 of the channels 410 and the outlet 408 of the body 402. The membrane 418 forms a passageway 420 to inhibit the flow of liquid through the inlet 406 and/or the channels 410 and allow the flow of gases and/or vapors between the inlet 406 and the outlet 408 without substantially affecting the flow rate of the gases or vapors passing through the passageway 420. The membrane 418 is coated with a fluoropolymer material such as, for example, polytetrafluoroethylene, perfluoroalkoxy, fluorinated ethylene propylene, etc. In the illustrated example, the membrane 418 is a substrate having micropores that is coated with Teflon® material. The substrate 418 may be, for example, a synthetic substrate, a woven substrate, a paper substrate, fiberglass substrate, a wire mesh cloth substrate, a fabric, a nylon substrate and/or any other suitable substrate having micropores.

In operation, the surge protector 400 helps to prevent liquid fuel from venting to the atmosphere through a vent line (e.g., the vent line 114 of FIG. 1) and/or passing to, for example, a vapor collection apparatus (e.g., the vapor collection apparatus 300 of FIGS. 3A and 3B). For example, during refueling, as the fuel tank fills with fuel, the fuel causes the flow control member 416 to engage the orifice 404 to prevent the flow of liquid fuel between the inlet 406 and the outlet 408, while the channels 410 enable fuel vapors to vent to the outlet 408. In the illustrated example, the membrane inhibits liquid fuel from passing through the orifice 404 and/or the channels 410 and causes the liquid fuel to return to the fuel tank without affecting the flow rate of the gases or the vapors. Thus, the example surge protector 400 described herein prevents and restricts the flow of liquid fuel between the inlet 406 and the outlet 408. In contrast to the surge protector 124 of FIG. 1, the membrane 418 prevents liquid fuel from passing through the passageway 420 when the surge protector 400 is subjected to overpowering fuel surges.

Figure 5B:
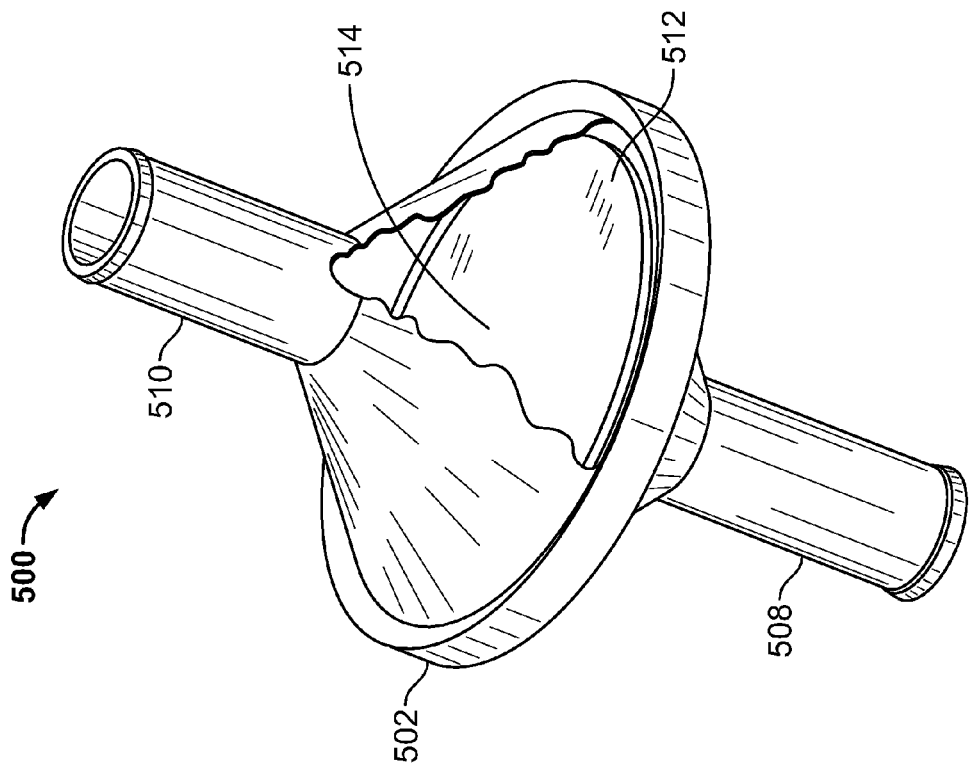
FIG. 5B is a partial cut away view of the example liquid-vapor separator apparatus of FIG. 5A.
Figure 5A:
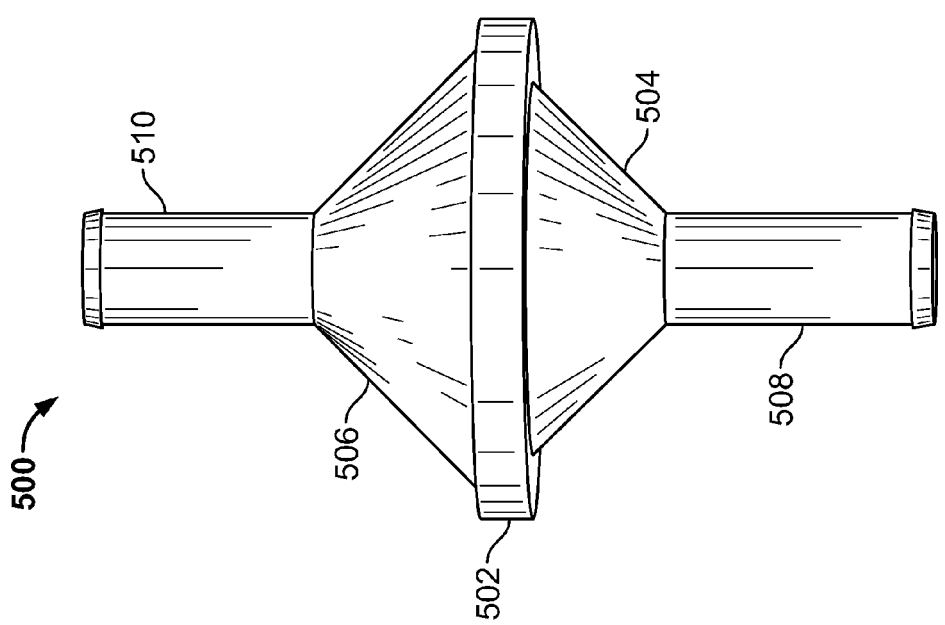
FIG. 5A illustrates an example liquid-vapor separator apparatus described herein.

FIG. 5A illustrates the example liquid-vapor separator apparatus 500 described herein and FIG. 5B is a sectional view of the example liquid-vapor separator apparatus 500 of FIG. 5A. Referring to FIGS. 5A and 5B, the liquid-vapor separator apparatus 500 includes a body 502 having a first enlarged cavity 504 and a second enlarged cavity 506 between an inlet 508 and an outlet 510. The liquid-vapor separator 500 is fluidly coupled to a vent line (e.g., the vent line 114 of FIG. 1) so that the inlet 508 is in fluid communication with a fuel tank (e.g., the fuel tank 102 of FIG. 1) and the outlet 510 is in fluid communication with a vapor control apparatus (e.g., the vapor control apparatus 300 of FIGS. 3A and 3B) and/or a vent apparatus (e.g., the vent apparatus 200 of FIGS. 2A-2C). The orientation of the liquid-vapor separator 500 may be any orientation that enables liquid fuel at the inlet 508 to drain to the fuel tank.

A membrane 512 is disposed between the cavities 504 and 506 to provide a passageway 514 that inhibit the flow of liquid between the inlet 508 and the outlet 510 and allow the flow of gases and/or vapors between the inlet 508 and the outlet 510 without affecting the flow rate of the gases or vapors through the passageway 514. The membrane 512 is coated with a fluoropolymer material such as, for example, polytetrafluoroethylene, perfluoroalkoxy, fluorinated ethylene propylene, etc. In the illustrated example, the membrane 512 is a substrate having micropores that is coated with Teflon® material. The membrane 512 may be, for example, a synthetic substrate, a woven substrate, a paper substrate, fiberglass substrate, a wire mesh cloth substrate, a fabric, a nylon substrate and/or any other suitable membrane having micropores.

In operation, when liquid fuel vents through the vent line, the membrane 512 diverts the liquid fuel to the second cavity 504 while vapors pass through the passageway 514. Thus, in contrast to the example liquid-vapor separator 126 of FIG. 1, the example liquid-vapor separator 500 can be mounted in any orientation that enables liquid fuel to drain from the inlet 508 to the fuel tank and prevents liquid fuel from passing through the passageway 514.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A vent apparatus for use with fuel systems, comprising:
a body defining an inlet;
a cover removably coupled to the body to form a gap between the body and a peripheral edge of the cover to define an outlet when the cover is coupled to the body, the cover having a passageway to fluidly couple the inlet and the outlet; and
a membrane coated with a fluoropolymer material and disposed between the outlet and the passageway to permit flow of gas through the outlet and to inhibit flow of liquid through the outlet without substantially impairing a flow rate of vapors or gases through the passageway, at least a portion of the membrane covering the gap.

2. A vent apparatus as defined in claim 1, wherein the body includes a cavity to receive the cover.

3. A vent apparatus for use with fuel systems comprising:
a body having an inlet and an outlet;
a cover removably coupled to the outlet of the body and having a passageway to fluidly couple the inlet and the outlet; and
a membrane coated with a fluoropolymer material and disposed between the outlet and the passageway to permit flow of gas through the outlet and to inhibit flow of liquid through the outlet without substantially impairing a flow rate of vapors or gases through the passageway, at least a first portion of the membrane to contact the cover and at least a second portion of the membrane to contact an inner surface of the body, wherein the body includes a cavity to receive the cover, and wherein the cavity includes a well to provide a liquid trap and provide a tortuous pathway between the inlet and the outlet of the body.

4. A vent apparatus for use with fuel systems comprising:
a body having an inlet and an outlet;
a cover removably coupled to the outlet of the body and having a passageway to fluidly couple the inlet and the outlet; and
a membrane coated with a fluoropolymer material and disposed between the outlet and the passageway to permit flow of gas through the outlet and to inhibit flow of liquid through the outlet without substantially impairing a flow rate of vapors or gases through the passageway, at least a first portion of the membrane to contact the cover and at least a second portion of the membrane to contact an inner surface of the body, wherein the membrane has an L-shaped cross-sectional shape.

5. A vent apparatus as defined in claim 1, wherein the fluoropolymer material comprises at least one of polytetrafluoroethylene, perfluoroalkoxy, or fluorinated ethylene propylene.

6. A vent apparatus as defined in claim 1, wherein the membrane comprises a mesh.

7. A vent apparatus as defined in claim 6, wherein the mesh comprises stainless steel.

8. A vent apparatus as defined in claim 1, wherein the membrane comprises a substrate having micropores.

9. A vent apparatus as defined in claim 8, wherein the substrate comprises a synthetic fiber substrate.

10. A vent apparatus as defined in claim 1, wherein the gas comprises at least one of atmospheric air or fuel vapors.

11. A vent apparatus for use with fuel systems, comprising:
a body defining a cavity and having a flow pathway between an inlet and an outlet;
a cover removably coupled to the body adjacent the outlet and having an opening to fluidly couple the inlet and the outlet of the body when the cover is coupled to the body, the cavity to receive the cover such that an outermost surface of the cover is adjacent an inner surface of the cavity; and
a membrane coated with a fluoropolymer material disposed within the cavity of the body immediately adjacent the outlet of the body, a first portion of the membrane to prevent egress of liquid fuel from the inlet to the outlet and a second portion of the membrane to be directly exposed to an environment surrounding the body to prevent ingress of liquid or contaminates through the outlet.

12. A vent apparatus for use with fuel systems, comprising:
a body defining a cavity and having a flow pathway between an inlet and an outlet;
a cover removably coupled to the body adjacent the outlet and having an opening to fluidly couple the inlet and the outlet of the body when the cover is coupled to the body wherein the cavity includes a well to provide a tortuous path to further prevent ingress of liquid in the pathway or egress of liquid fuel through the outlet; and
a membrane coated with a fluoropolymer material disposed within the cavity of the body immediately adjacent the outlet of the body, a first portion of the membrane to prevent the egress of liquid fuel from the inlet to the outlet and a second portion of the membrane to be directly exposed to an environment surrounding the body to prevent the ingress of liquid or contaminates through the outlet.

13. A vent apparatus as defined in claim 11, wherein the first portion of the membrane contacts an inner surface of the body and a second portion of the membrane contacts a surface of the cover.

14. A vent apparatus for use with fuel systems, comprising:
a body defining a cavity and having a flow pathway between an inlet and an outlet;
a cover removably coupled to the body adjacent the outlet and having an opening to fluidly couple the inlet and the outlet of the body when the cover is coupled to the body; and
a membrane coated with a fluoropolymer material disposed within the cavity of the body immediately adjacent the outlet of the body, a first portion of the membrane to prevent egress of liquid fuel from the inlet to the outlet and a second portion of the membrane to be directly exposed to an environment surrounding the body to prevent ingress of liquid or contaminates through the outlet, wherein the membrane has an L-shaped cross-sectional shape.

15. A vent apparatus as defined in claim 11, wherein the fluoropolymer material comprises at least one of polytetrafluoroethylene, perfluoroalkoxy, or fluorinated ethylene propylene.

16. A vent apparatus as defined in claim 11, wherein the membrane comprises a mesh.

17. A vent apparatus for use with fuel systems, comprising:
a body having a flow pathway between an inlet and an outlet, the body having a tapered portion to define a cavity of the body, the tapered portion includes a flange to be coupled to an exterior surface of a vehicle;
a cover removably coupled to the body adjacent the outlet, the cavity of the body to receive the cover such that an outer surface of the cover is configured to be positioned adjacent an inner surface of the flange, the cover having an opening to fluidly couple the inlet and the outlet of the body when the cover is coupled to the body; and
a membrane coated with a fluoropolymer material disposed within the cavity of the body adjacent the outlet of the body such that a first portion of the membrane is disposed between the inner surface of the flange and the outer surface of the cover to prevent ingress of liquid or contaminates through the flow pathway via the outlet and a second portion of the membrane is to prevent egress of liquid fuel from the inlet to the outlet.

18. A vent apparatus for use with fuel systems, comprising:
a body having a passageway between an inlet and an outlet, the body having a tapered portion to define a cavity of the body, the tapered portion includes a flange to be coupled to an exterior surface of a vehicle;
a cover removably coupled to the body adjacent the outlet and having an opening to fluidly couple the inlet and the outlet of the body when the cover is coupled to the body; and
a membrane coated with a fluoropolymer material disposed within the cavity of the body adjacent the outlet of the body such that a first portion of the membrane is disposed between the flange and the cover to prevent ingress of liquid or contaminates through the passageway via the outlet and a second portion of the membrane is to prevent egress of liquid fuel from the inlet to the outlet, wherein the cavity includes a well to provide a tortuous path to further prevent the ingress of liquid in the pathway or the egress of liquid fuel through the outlet.

19. A vent apparatus for use with fuel systems, comprising:
a body having a passageway between an inlet and an outlet, the body having a tapered portion to define a cavity of the body, the tapered portion includes a flange to be coupled to an exterior surface of a vehicle;
a cover removably coupled to the body adjacent the outlet and having an opening to fluidly couple the inlet and the outlet of the body when the cover is coupled to the body; and
a membrane coated with a fluoropolymer material disposed within the cavity of the body adjacent the outlet of the body such that a first portion of the membrane is disposed between the flange and the cover to prevent ingress of liquid or contaminates through the passageway via the outlet and a second portion of the membrane is to prevent egress of liquid fuel from the inlet to the outlet, wherein the membrane comprises an L-shaped cross-section.

20. A vent apparatus of claim 19, wherein the second portion of the membrane is coupled to a surface of the cavity and the first portion is coupled to a surface of the flange or the cover.

21. A vent apparatus as defined in claim 17, wherein the fluoropolymer material comprises at least one of polytetrafluoroethylene, perfluoroalkoxy, or fluorinated ethylene propylene.

22. A vent apparatus as defined in claim 17, wherein the membrane comprises a mesh.

23. A vent apparatus as defined in claim 22, wherein the mesh comprises stainless steel.

* * * * *